US012678709B2

(12) United States Patent
Wenzel

(10) Patent No.: US 12,678,709 B2
(45) Date of Patent: Jul. 14, 2026

(54) DISTILLATION SYSTEM

(71) Applicant: EvCon GmbH, Pliening-Landsham (DE)

(72) Inventor: Markus Wenzel, Unterhaching (DE)

(73) Assignee: EVCOM GMBH, Pliening-Landsham (DE)

( * ) Notice: Subject to any disclaimer, the term of this patent is extended or adjusted under 35 U.S.C. 154(b) by 220 days.

(21) Appl. No.: 18/441,299

(22) Filed: Feb. 14, 2024

(65) Prior Publication Data

US 2024/0278146 A1     Aug. 22, 2024

(30) Foreign Application Priority Data

Feb. 20, 2023     (EP) ..................................... 23157524

(51) Int. Cl.
  B01D 1/28          (2006.01)
  B01D 1/00          (2006.01)
    (Continued)

(52) U.S. Cl.
  CPC ........... B01D 5/006 (2013.01); B01D 1/0064 (2013.01); B01D 1/28 (2013.01); B01D 1/305 (2013.01);
    (Continued)

(58) Field of Classification Search
  CPC ........ B01D 1/0064; B01D 1/28; B01D 1/305; B01D 5/0003; B01D 5/006; B01D 5/009; C02F 1/041; C02F 1/043
  See application file for complete search history.

(56) References Cited

U.S. PATENT DOCUMENTS 7,431,805 B2 * 10/2008 Beckman ................. B01D 3/10
                                                 202/160
8,512,567 B2 * 8/2013 Shapiro ................... C02F 1/448
                                                 210/640
        (Continued)

FOREIGN PATENT DOCUMENTS

DE      102013220199 A1    4/2015
DE      102014110746 A1    2/2016
        (Continued)

OTHER PUBLICATIONS

ESSR for European patent application No. 23157524.2-1101, Jul. 17, 2023, 11 pages.

*Primary Examiner* — Jonathan Miller
(74) *Attorney, Agent, or Firm* — Merchant & Gould P.C.

(57)          ABSTRACT

Examples relates to a distillation system for concentrating a feed liquid, the system including a condensation unit and an adjacent evaporation unit, each unit being provided by a frame element assembled together to form a stack of frame elements, wherein the condensation unit includes a first steam space and a condensation wall at least partly bordering the first steam space, and a second steam space, wherein a feeding area between the condensation unit and the evaporation unit, the feeding area being bordered by the condensation wall, the system being configured such that the condensation wall is heated by a first steam in the first steam space, the feed liquid flows on the condensation wall in the feeding area, a second steam arising from the feed liquid moves into the second steam space, wherein the feeding area is open towards the second steam space.

16 Claims, 11 Drawing Sheets

(51) Int. Cl.

| | | |
|---|---|---|
| *B01D 1/30* | (2006.01) | |
| *B01D 5/00* | (2006.01) | |
| *C02F 1/04* | (2023.01) | |

(52) U.S. Cl.
CPC ........... *B01D 5/0003* (2013.01); *B01D 5/009* (2013.01); *C02F 1/041* (2013.01); *C02F 1/043* (2013.01)

(56) References Cited

U.S. PATENT DOCUMENTS

| | | | | |
|---|---|---|---|---|
| 8,888,078 | B2 | 11/2014 | Heinzl | |
| 9,416,031 | B2 * | 8/2016 | Escher | B01D 61/364 |
| 10,029,211 | B2 * | 7/2018 | Wenzel | B01D 65/02 |
| 10,376,807 | B2 * | 8/2019 | Chang | C02F 1/041 |
| 10,874,988 | B2 | 12/2020 | Hansen | |
| 11,400,417 | B2 * | 8/2022 | Wenzel | B01D 61/3641 |
| 11,712,662 | B2 * | 8/2023 | Borgmann | B01D 61/366 |
| | | | | 210/182 |
| 11,833,473 | B2 * | 12/2023 | Wenzel | B01D 63/0822 |
| 11,857,928 | B2 * | 1/2024 | Borgmann | B01D 3/065 |
| 12,134,075 | B2 * | 11/2024 | Heinzl | B01D 61/364 |

| | | | | |
|---|---|---|---|---|
| 2011/0108406 | A1 * | 5/2011 | Maisotsenko | B01D 3/346 |
| | | | | 202/180 |
| 2012/0048803 | A1 * | 3/2012 | Shapiro | B01D 61/3641 |
| | | | | 210/640 |
| 2012/0055776 | A1 * | 3/2012 | Feher | B01D 5/0027 |
| | | | | 202/174 |
| 2013/0168224 | A1 * | 7/2013 | Godshall | C02F 1/16 |
| | | | | 202/172 |
| 2017/0232391 | A1 * | 8/2017 | Wenzel | B01D 61/3641 |
| 2021/0245101 | A1 * | 8/2021 | Wenzel | B01D 61/366 |
| 2021/0245102 | A1 * | 8/2021 | Heinzl | C02F 1/447 |
| 2021/0245103 | A1 * | 8/2021 | Wenzel | B01D 61/366 |
| 2021/0245104 | A1 * | 8/2021 | Borgmann | B01D 63/084 |
| 2021/0245105 | A1 * | 8/2021 | Borgmann | C02F 1/445 |

FOREIGN PATENT DOCUMENTS

| | | |
|---|---|---|
| EP | 2156880 A1 | 2/2010 |
| EP | 2427263 A1 | 3/2012 |
| EP | 2627437 B1 | 8/2013 |
| WO | 2005089914 A1 | 9/2005 |
| WO | 2019233610 A1 | 12/2019 |
| WO | 2019233611 A1 | 12/2019 |

* cited by examiner

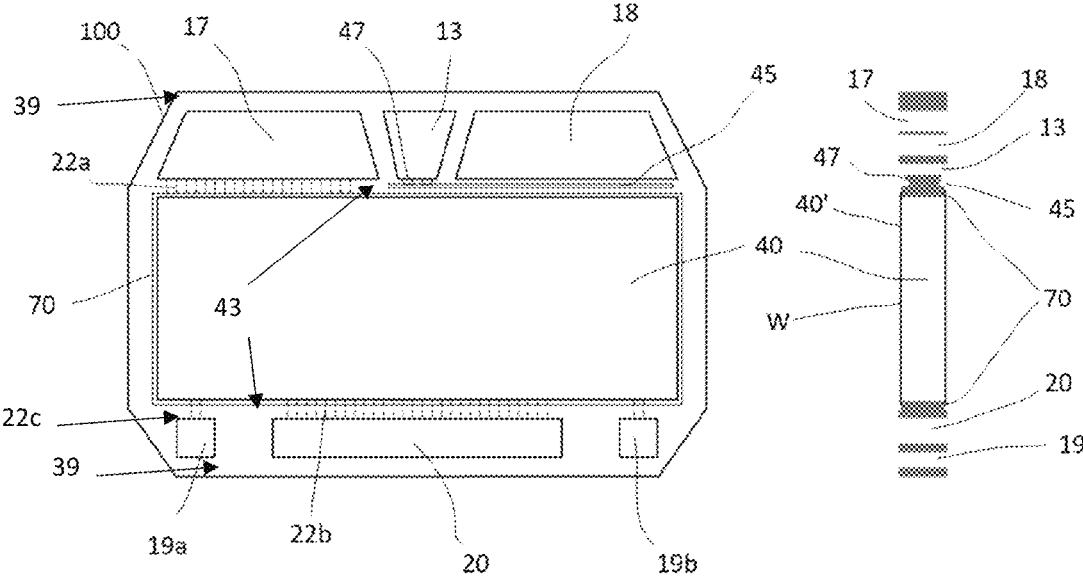
Fig. 1A                                                        Fig. 1B
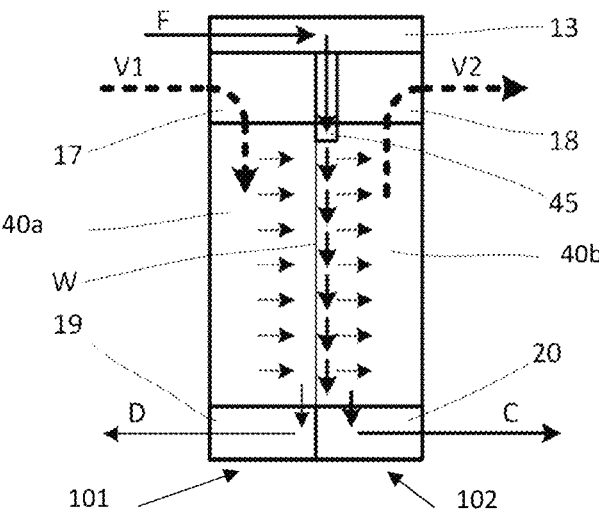
Fig. 2A

F1         F2         F3

V1 ⇢ | 201 | V2 ⇢ | 202 | V3 ⇢ | 203 | V4 ⇢

D1 → | 202 |   D2 → | 203 |   D3 →

C1          C2          C3

DISTILLATION SYSTEM

CROSS-REFERENCES TO RELATED APPLICATIONS

This application claims the benefit of priority to European (EP) patent application Ser. No. 23/157,524.2, filed Feb. 20, 2023, which is incorporated herein by reference in its entirety. To the extent appropriate, a claim of priority is made to the above application.

FIELD OF THE DISCLOSURE

The present disclosure is related to a distillation system, in particular for producing a distillate (e.g. sterile water). The distillation system may in particular comprise a modular flow system comprising a plurality of frame elements.

BACKGROUND OF THE DISCLOSURE

Modular flow systems comprising a plurality of frame elements are known e.g. from EP2427263 (A1) (or US 2012038069 (A1) of the same family). The plurality of frame elements can be combined by means of welded web structures to various stacks comprising in each case at least two, in particular at least ten frame elements, in order to a membrane distillation stage.

The frame elements comprise in each case an outer frame provided with passage openings and vapor and/or liquid channels as well as a central inner region surrounded by the outer frame. The vapor and/or liquid channels are arranged on the left and right sides of a respective frame element when combined together to form the modular flow system.

A pervaporation membrane is used, for example, to overcome the azeotropic point in the separation of multi-substance mixtures, such as alcohol and water, which cannot be overcome by conventional distillation methods.

Furthermore EP 2 627 437 B1 describes a multistage membrane distillation device comprising a heating stage, preferably multiple condensing/evaporating stages, and a condensing stage through which a liquid to be concentrated is passed in succession. Each condensing/evaporating stage comprises at least one condensing unit and at least one evaporating unit. Each condensing unit comprises a first steam chamber that is delimited at least partly by a condensation wall, and each evaporating unit comprises a second steam chamber that is delimited at least partly by a steam-permeable liquid-tight membrane wall.

A further device for distilling solutions using a membrane is known from WO 2005/089914 A1.

Still a further distillation apparatus is known from WO2019/233610 A1. The apparatus comprises a plurality of multistage membrane distillation modules, the modules being configured to be flowed through in parallel by a liquid to be concentrated. Each module comprises a plurality of serial condensation/evaporation stages configured to be flowed through in series by the liquid to be concentrated. Each condensation/evaporation stage comprises a plurality of parallel condensation/evaporation elements configured to be flowed through in parallel by the liquid to be concentrated. Each condensation/evaporation element comprises at least one condensation unit and at least one evaporation unit. The apparatus further comprises at least one of: a centralized heating stage configured to generate steam and to provide the steam to each of the modules in parallel, and a centralized condensation stage configured to receive steam from each of the modules in parallel and to condensate the steam.

Modular, i.e. frame-based flow systems have shown to be useful in practice due to their high flexibility. However, they may imply disadvantages in terms of maintenance, as the inside of the welded stacks of frame-elements may not be accessible from outside, e.g. for cleaning. Therefore, e.g. salt crystals or other solids remaining on the surface of (porous) membranes may only hardly be removed. Such flow systems may thus be less suitable for specific functions, e.g. for a crystallization process. In a crystallization process, a feed liquid is concentrated until saturation, i.e. until crystals grow.

SUMMARY OF THE DISCLOSURE

Currently, it remains desirable to provide a distillation system which implies reduced manufacturing and improved maintenance characteristics and which can be employed for further functions, e.g. for a crystallization process.

Therefore, the present disclosure relates to a distillation system for concentrating a feed liquid, comprising:

at least one condensation unit and at least one adjacent evaporation unit. Each unit is provided by a frame element assembled together to form a stack of frame elements.

The condensation unit comprises a first steam space and a condensation wall (W) at least partly bordering the first steam space.

The evaporation unit comprises a second steam space.

A feeding area is provided between the condensation unit and the evaporation unit, the feeding area being bordered by the condensation wall.

The system is configured such that:

the condensation wall is heated by a first steam in the first steam space the feed liquid flows on the condensation wall in the feeding area, a second steam arising from the feed liquid moves into the second steam space, wherein the feeding area is open towards the second steam space.

By providing such a system, it becomes possible to concentrate (i.e. distillate) a feed liquid without the need or use of a distillation membrane. It has been found that, since the feeding area (e.g. a feed gap) is bordered by the condensation wall on one side, the feed liquid can reliably run down on the condensation wall. Moreover, since the condensation wall is heated, the feed liquid is at least partially evaporated. Surprisingly, the steam resulting from the evaporation can be reliably separated from the feed liquid, even though no membrane is present between the feeding area and the second steam space. In other words, the feeding area is open towards the second steam space without a membrane between them.

Therefore, as the rather expensive membranes can be omitted in the system, the manufacturing costs can be reduced. Moreover, due to the omitted membranes, the system can operate more reliably, and maintenance can be improved. The membranes may namely be susceptible to defects, what requires further quality checks during manufacturing of the system. Moreover, it can be avoided that crystals stick to the porous membrane during operation of the system. In contrast, crystal stick less to the condensation wall, e.g. in form of a foil, and can be removed therefrom more reliably. Thus, e.g. a crystallization process performed by the system, where crystals can grow in the feeding area, becomes possible without harming the system.

The condensation wall may be flexible.

The condensation wall may e.g. comprise or is a foil.

In a further example, the condensation wall may be moveable within the feeding area.

The system may be configured such that the condensation wall is arranged vertically or at least partially vertically, such that the feed liquid can flow down on the condensation wall.

The system may be configured such that the condensation wall is deformed by the first steam into or towards the second steam space.

Accordingly, the feed liquid can flow on the condensation wall, as the condensation wall may be within the space below liquid passages which are configured to distribute the feed liquid from a first passage opening to the feeding area. Hence, the feed liquid is able to come into contact with the condensation wall and does not just drop down.

The system may be configured such that the condensation wall moves back to its initial position when the first steam is stopped to enter the first steam space or in case of a pressure balance between the first and the second steam space.

Accordingly, the deformation may be only temporary, such that the condensation may keep its initial form. However, it may also remain constantly in a deformed shape.

Deforming may comprise e.g. deflecting, stretching or moving the condensation wall.

The second steam space may comprise a grid-formed spacer element.

The system may be configured such that the condensation wall is deformed by the first steam to get into contact with the grid-formed spacer element.

Accordingly, the feed liquid running down the condensation wall can be better distributed accord the condensation wall due to the grid form of the contacting spacer. Hence, the evaporation efficiency can be increased.

The grid of the spacer element may have at least two struts oriented in different directions, which lie in different planes (i.e. one above the other). Typically, each plane may have a plurality of struts parallel to each other.

Since the struts may lie in different planes, the feed liquid can still run down the condensation wall without being blocked by the spacer element. Consequently, the feed liquid is better distributed but not dammed up.

The spacer element may be arranged in the second steam space in such a way that the grid openings form openings towards the feeding area.

Also the first and/or third steam space may comprise a spacer element, e.g. one similar to that one of the second steam space or another one.

The grid-formed spacer element may be thinner than the thickness of the frame element in a lateral view of the frame element.

Accordingly, there may be some free space within the frame element for e.g. the feeding area. The reduced thickness of the spacer element allows the feed liquid to run down from top to bottom in the inner region.

The total thickness of the frame element may (also) be defined by a protruding web structure configured to contact one frame element to another. The web structures may e.g. be welded web structures arranged on both sides of the frame element.

The inner frame may be thinner than the outer frame to provide the feeding area, i.e. in the form of a feed gap. The spacer element may be as thick as the inner frame.

A drain passage may be arranged below the second steam space and/or the feeding area.

In one example, a drain passage may always exist (at least below the second steam space and/or the feeding area), such that droplets of unevaporated, i.e. concentrated feed liquid (e.g. dirt water) can leave the evaporation unit. For example, this remaining feed liquid may flow into a concentrate collection tank.

The drain passage may be configured such that the feed liquid leaves the feeding area via the drain passage, optionally together with the second steam.

Accordingly, the second steam and the feed liquid may flow in the same direction downwards, and therefore may reliably remove any crystals from the condensation wall (which may e.g. just drop into the drain passage).

The vapor channel may be arranged above or laterally to the (first, second and/or third) steam space.

The system may further comprise at least one droplet elimination device consisting of at least one further frame element or a set of stacked frame elements.

The droplet elimination device may comprise a droplet elimination unit adjacent to the evaporation unit, such that the evaporation unit is between the droplet elimination unit and the condensation unit.

The droplet elimination device may comprise a third steam space connected to two vapor channels, such that the second steam flows from the second steam space via a vapor channel into the third steam space and leaves the third steam space via a further vapor channel.

The droplet elimination device may also be equipped with a membrane (i.e. a liquid-tight and vapor-permeable wall) to increase the separation efficiency for any potential droplets present in the second steam. However, it is noted that this optional membrane is not used to distillate (i.e. concentrate) the feed liquid.

The droplet elimination device may form a set of stacked frame elements which is separate and/or adjacent to the stack of frame elements forming the at least one condensation unit and at least one adjacent evaporation unit.

The droplet elimination device may comprise a third steam space connected via the drain passage (desirably only via the drain passage) to the second steam space, such that the second steam flows from the second steam space via the drain passage into the third steam space.

For example, the steam flows into the third steam space at the bottom, e.g. via the drain passage. Droplets of the unevaporated feed liquids may be separated at the bottom in the drain passage. The second steam separated from these droplets may leave the third steam space at the top.

The third steam space may be connected to a vapor channel (or only one vapor channel), such that the second steam leaves the third steam space via the vapor channel.

The droplet elimination device may form a set of stacked frame elements which may be separate and/or adjacent to the stack of frame elements forming the at least one condensation unit and at least one adjacent evaporation unit.

The vapor channel may be closed between both stacks.

The droplet elimination device may also form at least one frame element which is integrated into the stack of frame elements forming the at least one condensation unit and at least one adjacent evaporation unit, such that the at least one frame element (or set of frame elements) of the droplet elimination device is neighbored by and/or between two frame elements of respective evaporation units.

Each frame element may include:

an outer frame and an inner frame. For example, the inner frame may encase a central inner region and/or be surrounded by the outer frame, at least one passage opening, a drain passage and at least one vapor channel arranged between the outer frame and the inner frame.

The central inner region may provide a steam space.

The inner frame may comprise a surface which defines a plane, to which the condensation wall is attached for separating the first steam space from the second steam space.

The first steam space may be connected to at least one vapor channel by at least one vapor channel opening constituting a through hole in the inner frame of the condensation unit.

The through hole may be desirable, as it may be difficult to provide a connecting notch on the front side of said inner frame for this specific case. The reason is that the condensation wall (e.g. a foil) may be sealed on the front side of said inner frame.

The first steam space may be connected to a condensate collection passage arranged below the first steam space by at least one condensate channel opening constituting a through hole in the inner frame of the condensation unit.

The second steam space may be connected to the vapor channel by at least one vapor channel opening constituting a through hole in the inner frame of the evaporation unit and/or a connecting notch provided on a front side of said inner frame. For example, one channel may be provided with through holes, and the other channel with connecting notch, if it is difficult to drill through holes due to support struts in the other channel.

The second steam space may be connected to the drain passage by at least one vapor channel opening constituting a through hole in the inner frame of the evaporation unit and/or a connecting notch provided on a front side of said inner frame.

At least one passage opening may be arranged above the central inner region and separated from the central inner region by a frame wall of the inner frame.

At least one liquid passage may be provided by the frame wall and configured to distribute a liquid from the first passage opening to the feeding area.

The system may be a multistage distillation apparatus, comprising: a plurality of serial sets, each set comprising a stage and a droplet elimination device, each stage comprising at least one condensation unit and at least one evaporation unit.

A first set may be configured to generate steam and feed the steam to a second set (optionally of the same module like the first set), the first and the second set may e.g. be arranged on a similar height. The first set and a third set may be configured to be flowed through in series by the feed liquid. The first set may e.g. be above the third set (i.e. in the system).

For example, a plurality of multistage distillation modules may be arranged on different heights in the system. Each module may comprise a plurality of sets. The sets of a module may be arranged on a similar height, optionally by forming a horizontally arranged stack of frame elements. The modules may be arranged on different heights, optionally one above another.

The system may comprise or may be connected to a mechanical vapor compression, MVC, device, such that the second steam is compressed by the MVC device and fed back as first steam to the first steam space.

Using a MVC device may be advantageous for crystallizers (i.e. when the system operates in a crystallization process), as these require a relatively high temperature difference. This can be achieved by the compressor in an energy efficient manner.

The MVC device may hence replace a heating stage (for generating the first steam) and a condensation stage (for condensation of the second steam).

When using a MVC device, the system may typically comprise one stage. However, also several stages may be employed (e.g. up six stages), if the compressor provides the suitable power. Moreover, it is also possible that the system comprises several parallel stages connected in parallel to the MVC device.

Further optional aspects of the distillation system are described in the following.

The present disclosure may further relate to a multistage distillation system, comprising a plurality of multistage distillation modules, the modules being configured to be flowed through in parallel by a liquid to be concentrated. Each module may comprise a plurality of serial condensation/evaporation stages configured to be flowed through in series or in parallel by the liquid to be concentrated.

Each condensation/evaporation stage may comprise a plurality of parallel condensation/evaporation elements configured to be flowed through in parallel by the liquid to be concentrated. Each condensation/evaporation element comprises at least one condensation unit and at least one evaporation unit.

The system further desirably comprises at least one of: a centralized heating stage configured to generate steam and to provide the steam to each of the modules in parallel, and a centralized condensation stage configured to receive steam from each of the modules in parallel and to condensate the steam.

Accordingly the multistage distillation system may have a hierarchical organization with e.g. three levels (the system may also comprise more or less levels, e.g. two or four levels). On the first and highest level, the system comprises a plurality of parallel multistage distillation modules. On the second (lower) level, the system comprises a plurality of serial condensation/evaporation stages. On the third (lowest) level, the system comprises a plurality of parallel condensation/evaporation elements. A condensation/evaporation element may comprise a first and a second frame element, or more desirably it may be formed by two first frame elements sandwiching a second frame element, as described in the following.

Due to this arrangement the system may comprise up to several thousand condensation/evaporation elements, e.g. by simply combining several thousand first and a second frame elements, respectively.

Furthermore, by providing such an system, it is possible that several modules commonly use a centralized (or single) heating stage and/or a centralized (or single) condensation stage. Therefore the energy consumption of the centralized (or single) heating stage and/or a centralized (or single) condensation stage may be shared by a plurality of parallel modules what leads to an optimized efficiency of the system and at the same time (due to the use of more than one module) to a higher total output of the system.

In particular, the centralized heating and condensation stages can lead to a simplified design of the system, because several modules may be operated in parallel and each module does not require its own heating system. An increase in efficiency of the system may thus also be obtained and depends e.g. on the number of stages connected in series. The heat flow supplied at the front (i.e. at a first stage) and dissipated on the cold side (i.e. from the last stage toward the centralized condensation stage) may be used several times (i.e. at each stage from the first to the last stage) for condensation and evaporation due to the serial connection of the stages. If modules are connected in parallel, more heating heat may be required per additional module.

The centralized heating stage generates steam (i.e. a vapor) and provides the steam to each of the modules in parallel. Accordingly the modules (i.e. desirably the respective first stages) are heated with the supplied steam. In comparison to supplying (hot) liquid and generating steam individually in the respective modules (e.g. by using a vapor generator as known e.g. from EP 2 427 263 B1), the present disclosure has the advantage that due to thermodynamics steam will automatically be attracted most by the coldest surface. Hence, a module which is colder than the others will automatically be heated more. As a consequence, the temperature of the modules (i.e. in particular of their respective first stages) is automatically balanced.

In comparison, heating with (hot) liquid requires a very precise control implying high effort and reduced reliability.

The same applies to a centralized condensation stage. Due to thermodynamics the vapors (or steams) generated in the last stage of each module will be attracted by the centralized condensation stage depending on the temperature of the vapors. Hence, a module which generates hotter vapor (or steam) in its last stage will automatically supply more steam to the centralized condensation stage and will therefore be cooled more than the other (colder) modules. As a consequence, the heat of the modules is automatically balanced.

The centralized heating stage may be configured to provide the steam in each module to a first stage of the serial condensation/evaporation stages.

Accordingly, the first stage of each module may be heated by the centralized heating stage.

The centralized heating stage may be configured to provide the steam in each module to the condensation units of the first stage in parallel, in particular for heating said condensation units to a first predetermined temperature.

The centralized heating stage and/or the centralized condensation stage may be external to the modules, e.g. to the single stacks of frame elements forming the modules. The centralized heating stage and/or the centralized condensation stage may be connected to the modules by e.g. pipes, tubes and/or hoses.

Each condensation/evaporation stage may be formed by a single stack of frame elements providing the parallel condensation/evaporation elements.

Each module may be formed by a single stack of frame elements providing the serial condensation/evaporation stages.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, and serve to explain the principles thereof.

BRIEF DESCRIPTION OF THE DRAWINGS

FIG. 1a shows a schematic representation of the principle design of a frame element according to embodiments of the present disclosure in a front view;

FIG. 1b shows frame element of FIG. 1a in a side view;

FIG. 2A shows a schematic representation of the principle design of a distillation system according to embodiments of the present disclosure;

DESCRIPTION OF THE EMBODIMENTS

Figures 2B, 2C, 2D:
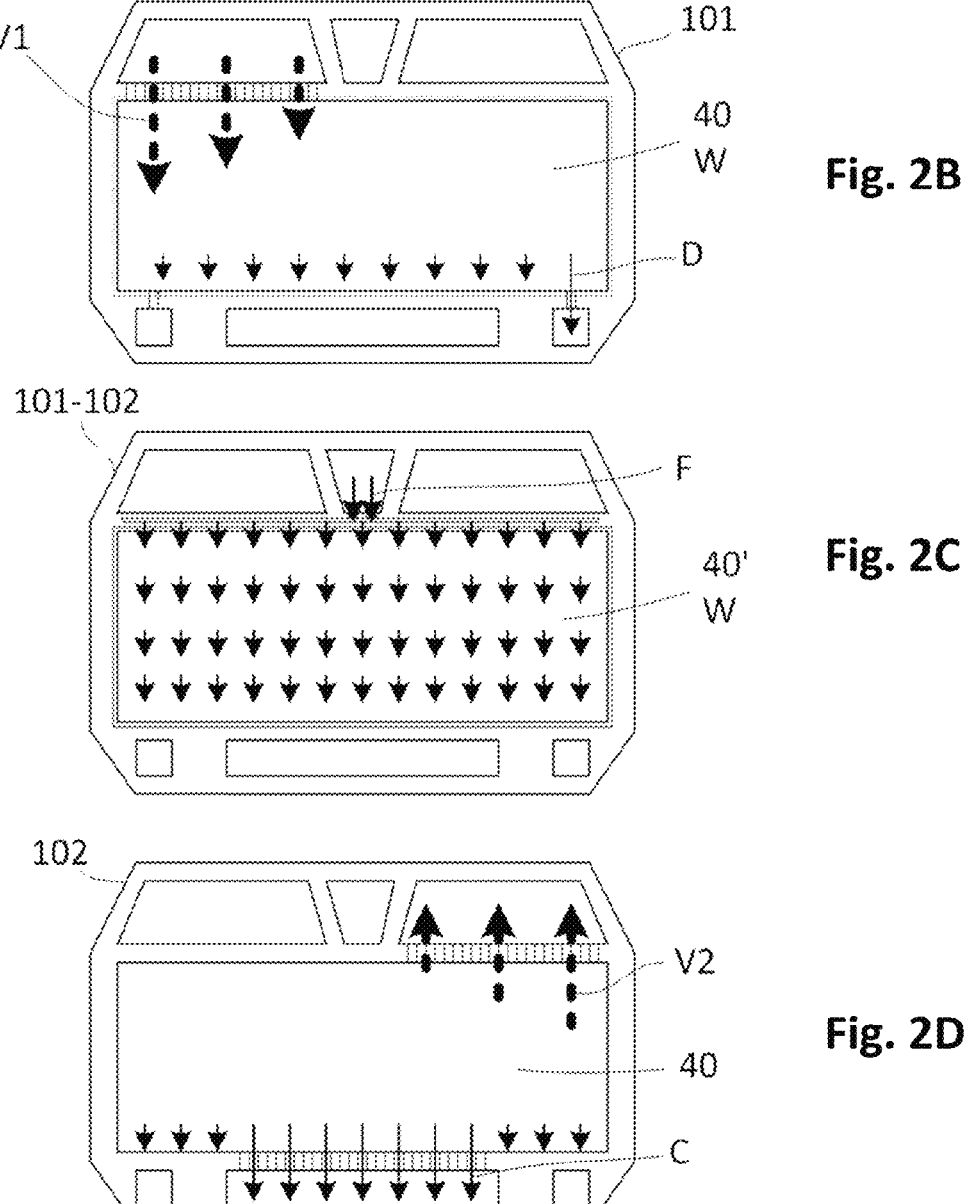
FIG. 2B shows a schematic representation of the vapor and liquid flow in a first frame element serving as a condensation unit of the system of FIG. 2A.
FIG. 2C shows a schematic representation of the feed flow in between a first and a second frame element of the system of FIG. 2A.
FIG. 2D shows a schematic representation of the vapor and liquid flow in a second frame element serving as an evaporation unit of the system of FIG. 2A.

Reference will now be made in detail to exemplary embodiments of the disclosure, examples of which are illustrated in the accompanying drawings. Wherever possible, the same reference numbers will be used throughout the drawings to refer to the same or like parts.

FIG. 1a shows a schematic representation of the principle design of a frame element according to embodiments of the present disclosure in a front view. FIG. 1b shows frame element of FIG. 1a in a side view.

The shown design 100 may apply to any one of the frame elements 101, 102, 103, 104, 111-113, 121-123 described in context of the examples below. However, according to the particular examples, the frame elements may comprise specific modifications, e.g. re. their vapor or liquid channels/openings or the use of a frame wall W.

Generally, the frame element 100 may include an outer frame 39 and an inner frame 43, the inner frame 43 encasing a central inner region 40 and being surrounded by the outer frame 39. On the lateral sides, the outer and inner frame may be merged or may be separated by further channels (not shown).

Furthermore, the frame element 100 may include at least one of: a passage opening 13, a drain passage 20, a condensate collection passage 19 (or two 19a, 19b) and at least one vapor channel 17, 18, each one arranged between the outer frame 39 and the inner frame 43 (above or below the inner region 40, as shown). The vapor channel 17 may also be denoted as "first" vapor channel and the vapor channel 18 may also be denoted as "second" or "further" vapor channel, wherein the order does not have any importance and may also be exchanged.

Note that the drain passage 20 may also have the function of a vapor channel, as described in some examples below. The central inner region 40 (i.e. first, second and third steam space 40a, 40b, 40c, as shown in examples below) provides a steam space.

It is noted that in schematic FIG. 1B the channels 17, 18 and the opening 13 are illustrated one over the other for simplicity reasons. However, the may actually be arranged on the same level, as shown e.g. in FIG. 1A. The same applies to the channels 19 (a, b) and 20.

The inner frame 43 may comprise a surface which defines a plane 70, to which a condensation wall W may be attached for separating a first steam space 40a from a second steam space 40b (cf. e.g. FIG. 2A).

The steam space 40 may be connected to at least one vapor channel 17, 18 by at least one vapor channel opening 22a constituting a through hole in the inner frame of the condensation unit 100 (and/or by a connecting notch provided on a front side of said inner frame, not shown in FIG. 1A).

Moreover, depending on the function of the frame element 100, the steam space 40 may be connected to the condensate collection passage 19a, 19b arranged below the steam space 40 by at least one condensate channel opening 22c constituting a through hole in the inner frame of the condensation unit 100, and/or to the drain passage 20 by at least one condensate channel opening 22b. Again, the through holes may be supplemented or replaced by respective connecting notches provided on a front side of the lower inner frame (not shown in FIG. 1A).

As mentioned, at least one passage opening 13 may be arranged above the central inner region 40 and separated from the central inner region by a frame wall of the inner frame. At least one liquid passage 45 may be provided by the frame wall and configured to distribute a liquid from the first passage opening to a feeding area 40'. The feeding area may be in the form of a feeding gap aligned with the inner region 40 of the frame element and being in front of the inner region 40. The feeding area 40' is described in more detail in context of FIG. 2A.

A liquid passage 45 may be provided by the upper frame wall of the inner frame and is configured to distribute a feed from the first passage opening 13 to the feeding area 40'. The liquid passage 45 may extend asymmetrically by extending from a central section of the first frame side (below the first opening 13) into only one first direction along the first frame side (e.g. in FIG. 1A to the right) without extending into the opposite direction. The first liquid passage 45 may be connected to the first passage opening 13, in particular by connecting notches 47 provided on a front side of the first upper frame wall or a connecting channel provided inside said frame wall.

It is noted that the system may comprise a further type of frame element which is principally similar to that one of FIG. 1A, however, which desirably comprises a complementary liquid passage 45, such that the liquid passages of stacked first and adjacent second frame elements form together a liquid passage extending across (i.e. over the full length of) the complete first upper side of the feeding area 40'. Accordingly, the liquid passage 45 of the other (second) frame type may extend asymmetrically by extending from a central section of the first frame side (below the first opening 13) into only a second direction along the first frame side (e.g. in FIG. 1A to the left) without extending into the opposite first direction.

As a consequence, it is possible to provide channel openings 22a constituting through holes in the inner frame in those areas where no liquid passage is provided. As a consequence, there is no interference of the liquid passage and the other function. Hence, the thickness of the frame wall (in particular in a front view of the frame member) may be reduced and hence, desirably of the complete frame element. As a consequence, due to the thinner frames, less frame material is required, which can reduce the costs of the system. Furthermore, the system can be made more compact, which saves space and weight.

FIG. 2A shows a schematic representation of the principle design of a distillation system according to embodiments of the present disclosure.

FIG. 2B shows a schematic representation of the vapor and liquid flow in a first frame element serving as a condensation unit of the system of FIG. 2A.

FIG. 2C shows a schematic representation of the feed flow in between a first and a second frame element of the system of FIG. 2A.

FIG. 2D shows a schematic representation of the vapor and liquid flow in a second frame element serving as an evaporation unit of the system of FIG. 2A.

The distillation system may be configured for concentrating a feed liquid F, e.g. dirt water or any solvent containing a salt.

The system comprises at least one condensation unit 101 and at least one adjacent evaporation unit 102. Each unit is provided by a frame element 101, 102 assembled together to form a stack of frame elements. The condensation unit may comprise a first steam space 40a and a condensation wall W at least partly bordering the first steam space 40a. The evaporation unit 102 may comprise a second steam space 40b. A feeding area 40' may be provided between the condensation unit and the evaporation unit. The feeding area 40' is bordered by the condensation wall.

The system is configured such that the condensation wall can be heated by a first steam V1 in the first steam space 40a. The system is further configured such that feed liquid F flows on the condensation wall W in the feeding area, such that a second steam V2 arising from the feed liquid F moves into the second steam space 40b. The feeding area 40' may be open towards the second steam space 40b in the sense that there is desirably no membrane between the feeding area 40' and the second steam space 40b.

The condensation wall W may be flexible, wherein the condensation wall W optionally may comprise or may be a foil.

The first steam space 40a may be connected to at least one vapor channel 17 by at least one vapor channel opening constituting a through hole in the inner frame of the condensation unit 101 such that the first steam V1 can enter the first steam space. The first steam space 40a may be further connected a condensate collection passage 19a, 19b arranged below the first steam space 40a, e.g. by at least one condensate channel opening 22b constituting a through hole in the inner frame of the condensation unit 101 (also cf. FIG. 1A, 2B). A condensate D resulting from the condensed first steam V1 may thus leave the first steam space 40a via said collection passage 19a, 19b (also cf. FIG. 2B).

The frame elements 101, 102 are configured such (e.g. by the welding web structure(s) or another spacer element in between) that a gap remains between the frame elements when they are stacked in the modular flow system. This gap in particular forms a feeding area 40' being aligned with the inner regions of the stacked frame elements and being in front of the first and second steam spaces 40a, 40b of the adjacent frame elements.

The feeding area 40' is bordered on a first side by the condensation wall W toward the first steam space 40a. However, on a second, opposite side the feeding area 40' is open towards the second steam space 40b.

A feed (or feed liquid) F is supplied via the first passage opening 13 to the feeding area 40'. Said feed may be a liquid, e.g. salt water or dirt water which is distilled and/or cleaned by the modular flow system. The feed may have a temperature slightly lower than the vapor V1, e.g. a difference of 4 to 6° C.

Due to the heat transferred from the condensing vapor V1, the feed F is heated and evaporates, such that the second steam V2 is generated. In this regard it is possible that the pressure within the feeding area or in parts of the modular flow system is reduced such that the feed boils when heated.

Due to the distillation, the second steam V2 enters from the feeding area 40' the second steam space 40b of the frame element 102. Said steam V2 may have an equal or only a slightly lower temperature than the (boiling) feed F.

Figure 8:
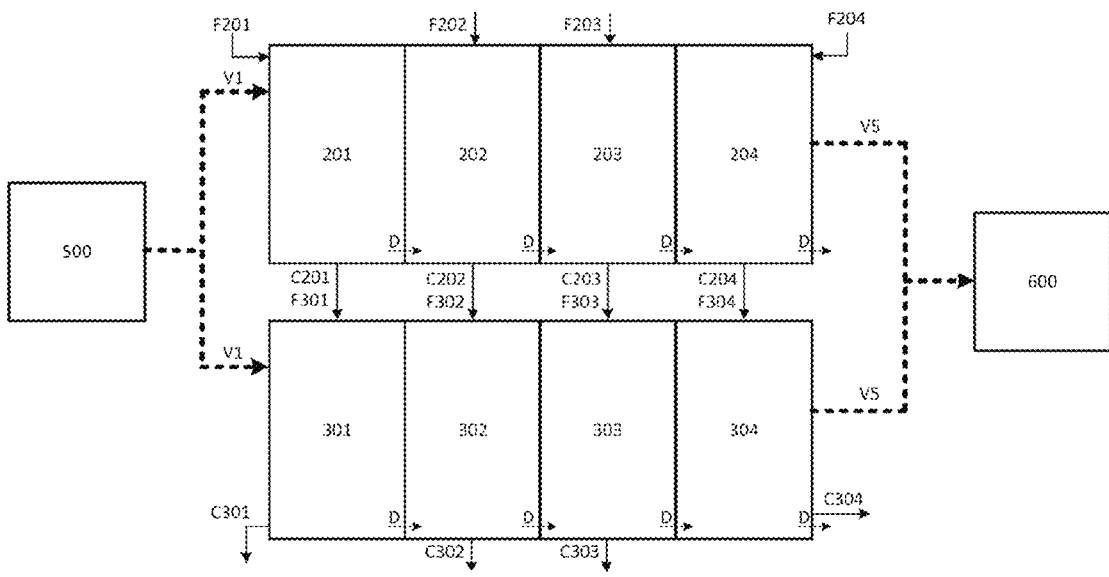
FIG. 8 shows a schematic representation of a further example of a distillation system comprising a plurality of parallel multi-stage modules according to embodiments of the present disclosure.

The arrangement shown in FIG. 2B to 2D shows a first stage 201 of the modular flow system of FIG. 8. Said vapor leaving the second frame element 102 may be transmitted to a second stage 202 of the modular flow system where it may be used as (heating) vapor in a first frame element 101 again. Thus, the modular flow system may have several stages (e.g. 10 or more) wherein in each subsequent stage the temperatures of the supplied vapor and feed are slightly decreased with regard to the preceding stage.

A drain passage 20 may be arranged below the second steam space 40b and/or the feeding area 40', the drain passage 20 being configured such that the feed liquid f can leave the feeding area 40' via the drain passage 20.

The second steam space 40b may be connected to a vapor channel 18 by at least one vapor channel opening constituting a through hole 22a in the inner frame of the evaporation unit 102 (cf. FIG. 1A, 2C). The second steam space 40b may alternatively be connected to the drain passage 20 by at least one vapor channel opening constituting a through hole 22b in the inner frame of the evaporation unit 102, 112, 122 (cf. FIG. 1A, 2C). The second steam V2 may thus leave the second steam space 40b via the vapor channel 18 and/or the drain passage 20.

Due to the arrangement of the vapor channels above the inner region 40, the whole inner region 40 may serve as a barrier for droplets being carried with the flow of the created vapor V2. In other words, the feed would need to fill the complete inner region, in order to pass the barrier given by the configuration of the frame element, i.e. to flow into the vapor channel 18. Accordingly, there must be a proper separation of the steam V2 from feed. The vapor channels arranged in an upper area of the frame element are advantageous because of the gravity separation. Hence, any contamination of the final product (i.e. the distillate) can be effectively prevented. This effect may also be used in a droplet separation device (cf. FIG. 3A to 5E), in which the second steam V2 leaves the droplet separation device via vapor channel 18 arrange above the steam space (i.e. the inner region).

The condensation wall W may be moveable within the feeding area. In particular, the system may be configured such that the condensation wall may be deformed by the first steam into or towards the second steam space 40b. Moreover, the system may be configured such that the condensation wall moves back to its initial position when the first steam may be stopped to enter the first steam space or in case of a pressure balance between the first and the second steam space.

Figure 5A:
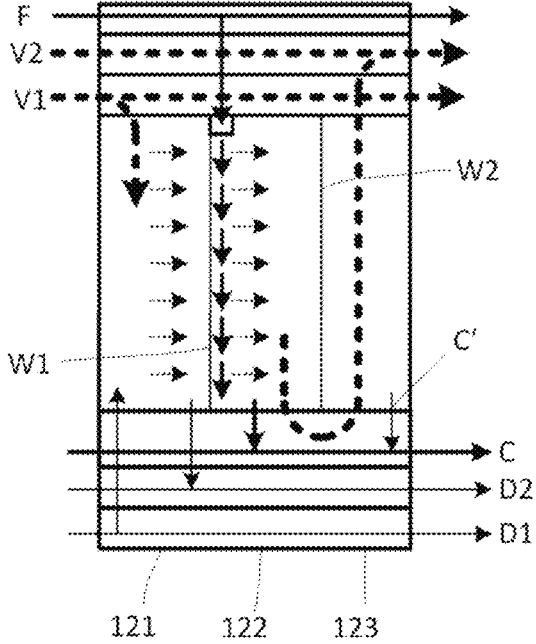
FIG. 5A shows a schematic representation of a third example of a distillation system comprising an integrated droplet separation device according to embodiments of the present disclosure.
Figures 5B, 5C, 5D:
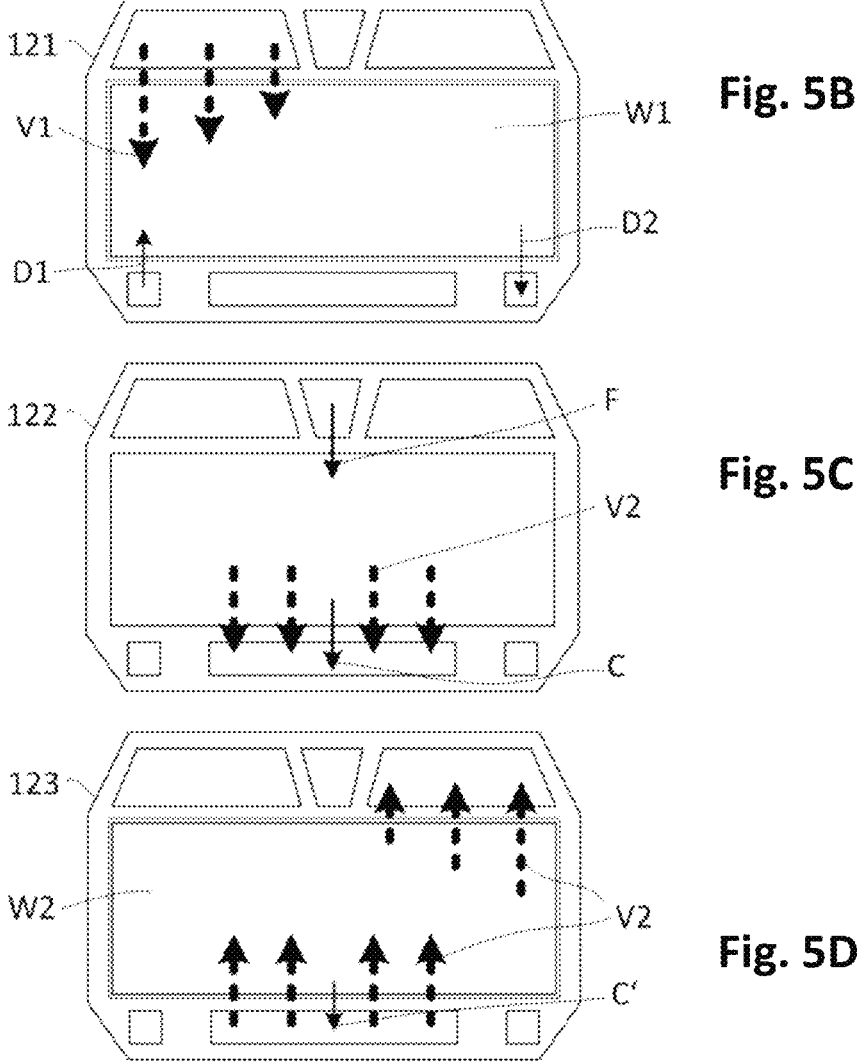
FIG. 5B shows a schematic representation of the vapor and liquid flow in a first frame element serving as a condensation unit of the system of FIG. 5A.
FIG. 5C shows a schematic representation of the feed flow in between the first and a second frame element, and of the vapor and liquid flow in the second frame element serving as an evaporation unit of the system of FIG. 5A.
FIG. 5D shows a schematic representation of the vapor and liquid flow in a third frame element serving as the droplet separation device of the system of FIG. 5A.
Figures 5E, 6:
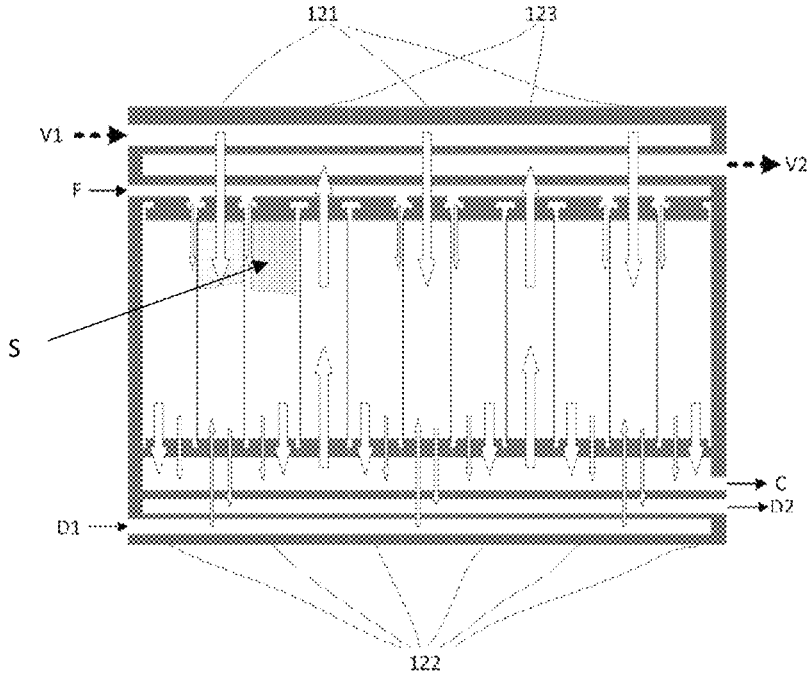
FIG. 5E shows a schematic representation of the distillation system of FIG. 5A having a plurality of parallel evaporation and condensation units and a plurality of frame elements of the droplet separation device.
FIG. 6 shows a schematic representation of a further example of a distillation system comprising a plurality of serial stages (or sets comprising each a stage and a droplet elimination device) according to embodiments of the present disclosure.

The second steam space (and optionally also the first steam space) may comprise a grid-formed spacer element S (cf. e.g. FIG. 5E). The system may be configured such that the condensation wall may be deformed by the first steam to get into contact with the grid-formed spacer element S. The grid-formed spacer element may be thinner than the thickness of the frame element in a lateral view of the frame element.

Figures 2E, 3A, 3B:
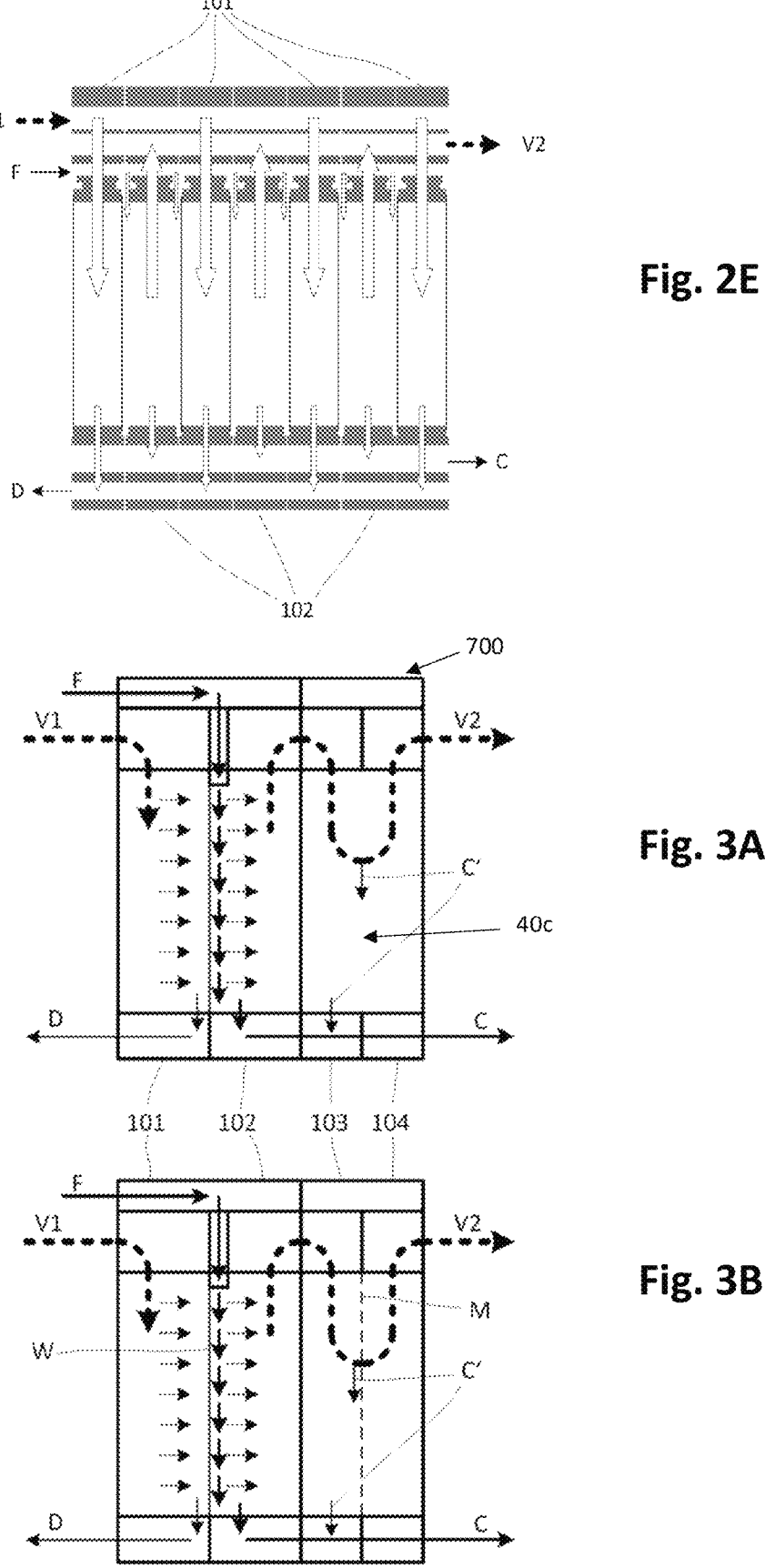
FIG. 2E shows a schematic representation of the distillation system of FIG. 2A having a plurality of parallel evaporation and condensation units.
FIG. 3A shows a schematic representation of a first example of a distillation system comprising an external droplet separation device according to embodiments of the present disclosure.
FIG. 3B shows a schematic representation of the distillation system of FIG. 3A with a slight modification (i.e. use of a membrane in the droplet separation device)

FIG. 2E shows a schematic representation corresponding to the distillation system of FIG. 2A but having a plurality of parallel evaporation and condensation units. Accordingly, the capacity (i.e. the active area where second steam V2 is generated) of a single stage can be increased. In this case, the frame elements 101, 102 may be arranged alternately.

FIG. 3A shows a schematic representation of a first example of a distillation system comprising an external droplet separation device according to embodiments of the present disclosure.

FIG. 3B shows a schematic representation of the distillation system of FIG. 3A with a slight modification (i.e. use of a membrane in the droplet separation device).

Figures 3C, 3D, 3E, 3F:
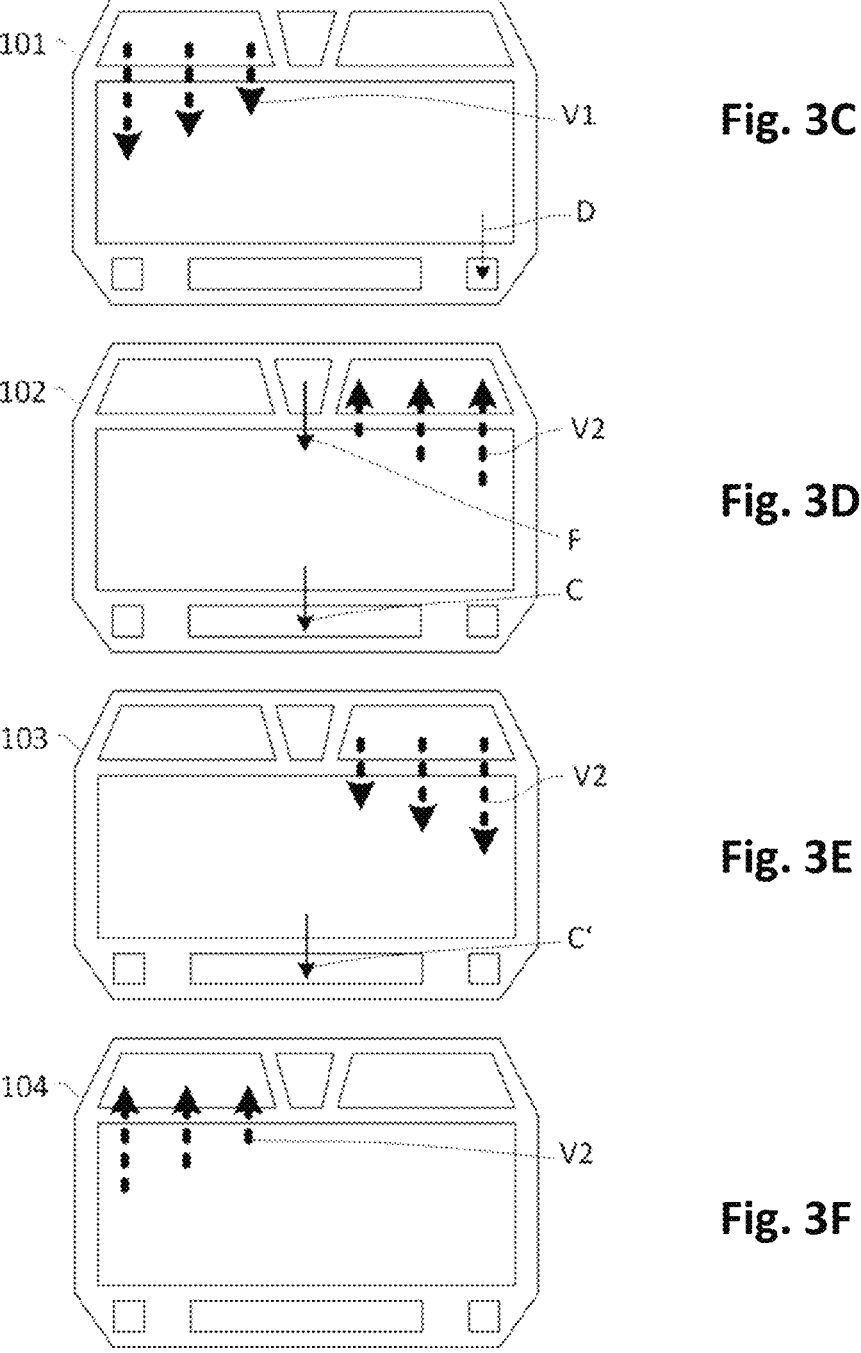
FIG. 3C shows a schematic representation of the vapor and liquid flow in a first frame element serving as a condensation unit of the system of FIG. 3A.
FIG. 3D shows a schematic representation of the feed flow in between the first and a second frame element, and of the vapor and liquid flow in the second frame element serving as an evaporation unit of the system of FIG. 3A.
FIG. 3E shows a schematic representation of the vapor and liquid flow in a third frame element serving as a first frame type of the droplet separation device of the system of FIG. 3A.
FIG. 3F shows a schematic representation of the vapor and liquid flow in a fourth frame element serving as a second frame type of the droplet separation device of the system of FIG. 3A.

FIG. 3C shows a schematic representation of the vapor and liquid flow in a first frame element serving as a condensation unit of the system of FIG. 3A.

FIG. 3D shows a schematic representation of the feed flow in between the first and a second frame element, and of the vapor and liquid flow in the second frame element serving as an evaporation unit of the system of FIG. 3A.

FIG. 3E shows a schematic representation of the vapor and liquid flow in a third frame element serving as a first frame type of the droplet separation device of the system of FIG. 3A.

FIG. 3F shows a schematic representation of the vapor and liquid flow in a fourth frame element serving as a second frame type of the droplet separation device of the system of FIG. 3A.

The system of this example may principally correspond to the system shown in FIG. 2A. However, it may further comprise at least one droplet elimination device 700 consisting of at least two further frame elements 103, 104.

The droplet elimination device 700 may comprise a third steam space 40c connected to two vapor channels 17, 18, such that the second steam flows from the second steam space 40b via a vapor channel 18 into the third steam space 40c in frame element 103 and leaves the third steam space via a further vapor channels 17 frame element 104. The droplet elimination device 700 may hence form a set of stacked frame elements 103, 104 which is separate and/or adjacent to the stack of frame elements forming the at least one condensation unit 101 and at least one adjacent evaporation unit 102.

As a consequence, in this example the system may comprise or be constituted by four different frame types 101 to 104. The droplet elimination device 700 may be separate to the evaporation and condensation stage (i.e. frames 101, 102). The second steam V2 may enter the droplet elimination device 700 may from top (i.e. via a vapor channel 18 and leave the droplet elimination device 700 in the top via a vapor channel 17. Accordingly, the system desirably comprise two separate vapor channels 17, 18 in this example. Since one vapor channel 18 is also used to transport the first steam V1 (cf. FIG. 3C), this vapor channel is desirably closed between the stage and the droplet elimination device 700.

In the modified example of FIG. 3B the droplet elimination device may also be equipped with a membrane M (i.e. a liquid-tight and vapor-permeable wall) to increase the separation efficiency for any potential droplets present in the second steam. However, it is noted that this optional membrane is not used to distillate (i.e. concentrate) the feed liquid.

Figures 3G, 4A:
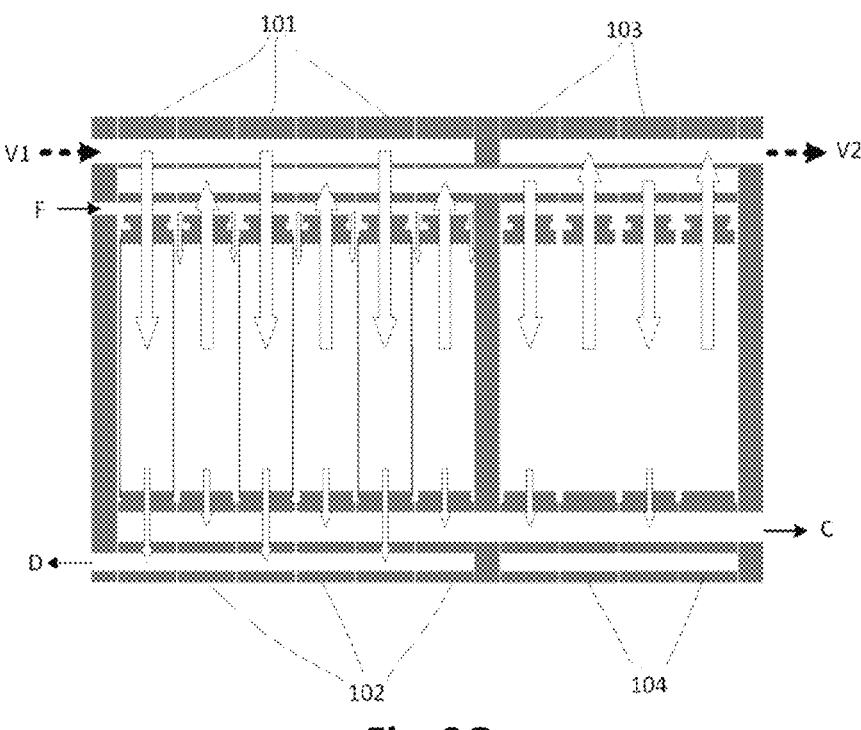
FIG. 3G shows a schematic representation of the distillation system of FIG. 3A having a plurality of parallel evaporation and condensation units and a plurality of parallel first and second frame type of the droplet separation device.
FIG. 4A shows a schematic representation of a second example of a distillation system comprising an external droplet separation device according to embodiments of the present disclosure.

FIG. 3G shows a schematic representation of the distillation system of FIG. 3A having a plurality of parallel evaporation and condensation units and a plurality of parallel first and second frame type of the droplet separation device.

In other words, the system of this example may principally correspond to the system shown in FIG. 2E. However, it may further comprise at least one droplet elimination device 700 consisting of a set of stacked frame elements 103, 104. The droplet elimination device 700 may be external to the stack of evaporation and condensation unit. By increasing the number of stacked frame elements 103, 104, the possible throughput of second steam V2 can be increased without increasing the steam velocity. Accordingly, the risk of carrying away any droplets of the feed liquid in the second steam can be reduced.

FIG. 4A shows a schematic representation of a second example of a distillation system comprising an external droplet separation device according to embodiments of the present disclosure.

Figures 4B, 4C, 4D:
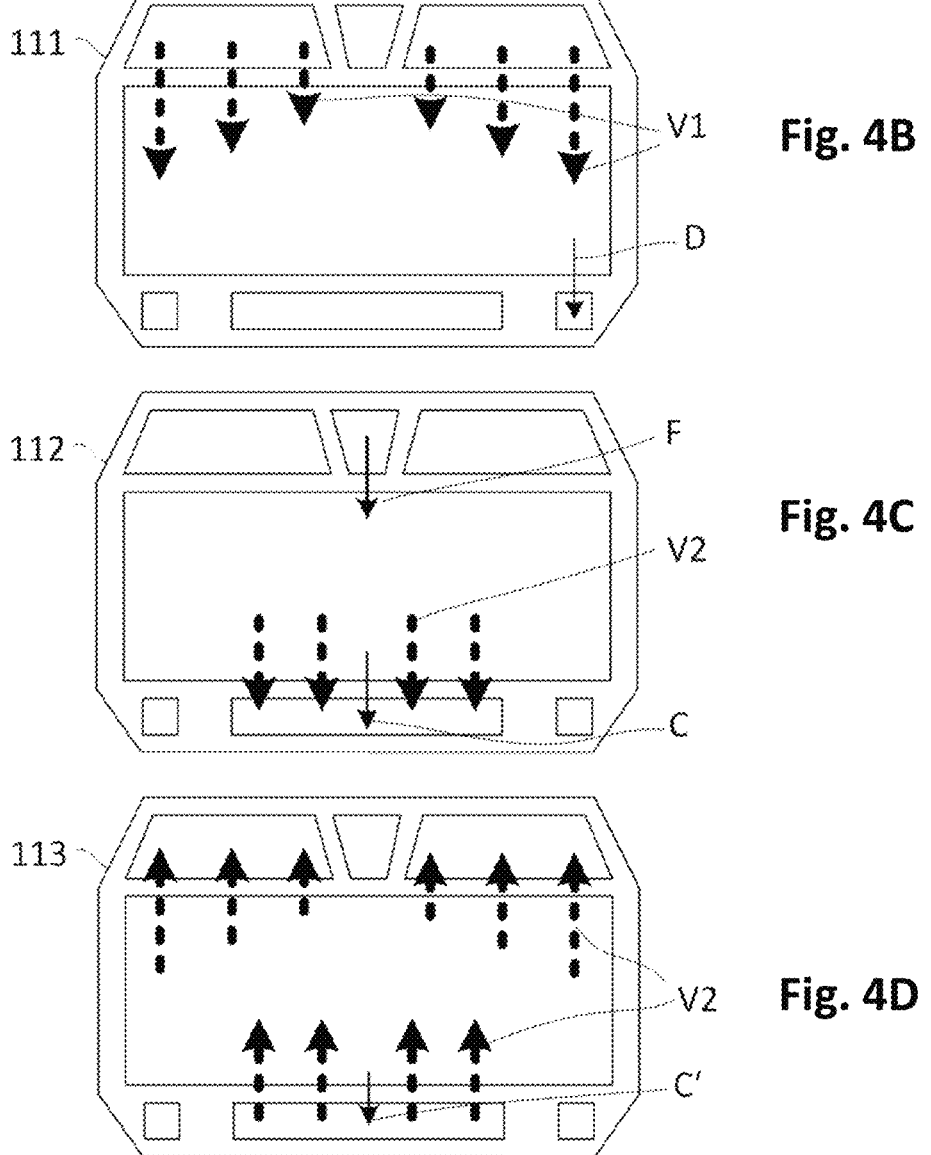
FIG. 4B shows a schematic representation of the vapor and liquid flow in a first frame element serving as a condensation unit of the system of FIG. 4A.
FIG. 4C shows a schematic representation of the feed flow in between the first and a second frame element, and of the vapor and liquid flow in the second frame element serving as an evaporation unit of the system of FIG. 4A.
FIG. 4D shows a schematic representation of the vapor and liquid flow in a third frame element serving as the droplet separation device of the system of FIG. 4A.

FIG. 4B shows a schematic representation of the vapor and liquid flow in a first frame element serving as a condensation unit of the system of FIG. 4A.

FIG. 4C shows a schematic representation of the feed flow in between the first and a second frame element, and of the vapor and liquid flow in the second frame element serving as an evaporation unit of the system of FIG. 4A.

FIG. 4D shows a schematic representation of the vapor and liquid flow in a third frame element serving as the droplet separation device of the system of FIG. 4A.

The system of this example may principally correspond to the system shown in FIG. 3A. However, it may comprise some modifications in the vapor channels and in the droplet elimination device 700.

The droplet elimination device 700 may consist of at least one further frame element 113 or may form a set of stacked frame elements 113 (cf. FIG. 4E) which may be separate and/or adjacent to the stage, i.e. the stack of frame elements forming the at least one condensation unit 111 and at least one adjacent evaporation unit 112.

Again, the droplet elimination device 700 may comprise a third steam space 40c which however in this example is connected via the drain passage 20 to the second steam space 40b, such that the second steam flows from the second steam space 40b via the drain passage 20 into the third steam space 40c (cf. FIGS. 4C and 4D).

The third steam space 40c may thus be connected to only one vapor channel 17 or 18, such that the second steam leaves the third steam space 40c via this vapor channel. As a consequence, the system may comprise only one vapor channel 17 or 18, or these channels may be merged/connected to one bigger channel. As a further consequence, the vapor channel 17, 18 is closed between both stage and the droplet elimination device 700 (cf. FIG. 4E).

As a consequence, in this example the system may comprise or be constituted by three different frame types 111, 112 and 113. The droplet elimination device 700 may be separate to the evaporation and condensation stage (i.e. frames 111, 112). The second steam V2 may enter the droplet elimination device 700 may from bottom (i.e. via the drain passage 20) and leave the droplet elimination device 700 in the top via a vapor channel 17/18. Accordingly, the system may comprise only one vapor channels 17/18 in this example, as explained above.

This exemplary configuration can be advantageous if crystals (or other solids/deposits) may occur in the distillation process, as these crystals are discharged downwards by the feed liquid and the second steam. This exemplary configuration may thus be suitable when the system shall be operated in a crystallization process.

As a further advantage, since the vapor channels 17, 18 may be combined to one larger vapor channel, the capacity of steam transportation and thus of the distillation process may be increased, and/or the dimension of the frame elements may be decreased (e.g. by reducing the size of the combined channel).

Figure 4E:
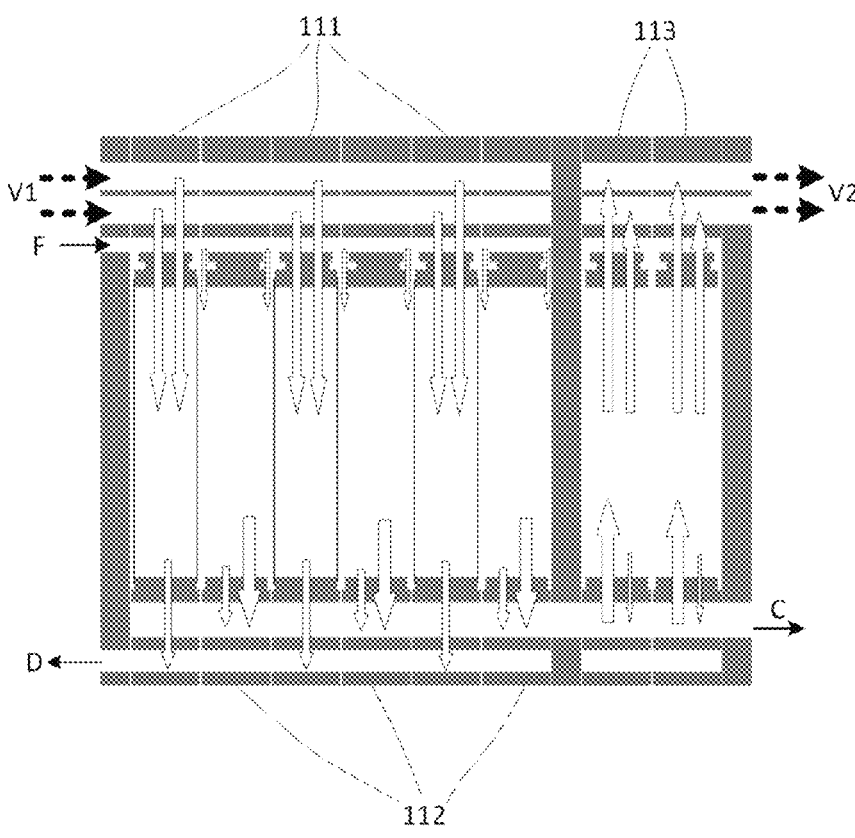
FIG. 4E shows a schematic representation of the distillation system of FIG. 4A having a plurality of parallel evaporation and condensation units and a plurality of frame elements of the droplet separation device.

FIG. 4E shows a schematic representation of the distillation system of FIG. 4A having a plurality of parallel evaporation and condensation units and a plurality of frame elements of the droplet separation device.

In other words, the system of this example may principally correspond to the system shown in FIG. 2E (with the above-mentioned modification of the steam flow via drain passage 20). It may further comprise at least one droplet elimination device 700 consisting of a set of stacked frame elements 113. The droplet elimination device 700 may be external to the stack of evaporation and condensation unit. By increasing the number of stacked frame elements 113 the possible throughput of second steam V2 can be increased without increasing the steam velocity. Accordingly, the risk of carrying away any droplets of the feed liquid in the second steam can be reduced.

FIG. 5A shows a schematic representation of a third example of a distillation system comprising an integrated droplet separation device according to embodiments of the present disclosure.

FIG. 5B shows a schematic representation of the vapor and liquid flow in a first frame element serving as a condensation unit of the system of FIG. 5A.

FIG. 5C shows a schematic representation of the feed flow in between the first and a second frame element, and of the vapor and liquid flow in the second frame element serving as an evaporation unit of the system of FIG. 5A.

FIG. 5D shows a schematic representation of the vapor and liquid flow in a third frame element serving as the droplet separation device of the system of FIG. 5A.

The system of this example may principally correspond to the system shown in FIG. 4A. However, the droplet elimination device 700 forms in this example at least one frame element 123. This frame element 123 is integrated into the stack of frame elements forming the at least one condensation unit 121 and at least one adjacent evaporation unit 122.

The droplet elimination device 700 may thus consist of at least one further frame element 123 which may be adjacent to the evaporation unit 122.

Again, the droplet elimination device 700 may comprise a third steam space 40*c* which is connected via the drain passage 20 to the second steam space 40*b*, such that the second steam flows from the second steam space 40*b* via the drain passage 20 into the third steam space 40*c* (cf. FIGS. 5C and 5D). A further foil W2 (or other type of wall comparable to the condensation wall W) is desirably arranged between the second steam space 40*b* and third steam space 40*c*.

The third steam space 40*c* may thus be connected to only one vapor channel 17 or 18, such that the second steam leaves the third steam space 40*c* via this vapor channel.

However, in this example the system desirably comprises two vapor channel 17 18, such that the first vapor V1 and the second vapor V2 can be kept separated from each other in one stage (cf. FIG. 5E).

As a further consequence, a first vapor channel 17 may be closed at the end of one stage and a second vapor channel 18 may be closed at the beginning of one stage (cf. FIG. 5E).

Accordingly, in this example the system may comprise or be constituted by three different frame types 121, 122 and 123. The evaporation and condensation stage (i.e. frames 121, 122) may comprise and integrated droplet elimination device 700. The second steam V2 may enter the droplet elimination device 700 may from bottom (i.e. via the drain passage 20) and leave the droplet elimination device 700 in the top via a vapor channel 18.

This exemplary configuration can be advantageous if crystals (or other solids/deposits) may occur in the distillation process, as these crystals are discharged downwards by the feed liquid and the second steam. This exemplary configuration may thus be suitable when the system shall be operated in a crystallization process.

Generally, it is noted with regard to any example of the present disclosure that the function of the two vapor channels 17, 18 may also be exchanged, i.e. channel 17 is configured to perform the function of channel 18 and vice versa.

FIG. 5E shows a schematic representation of the distillation system of FIG. 5A having a plurality of parallel evaporation and condensation units and a plurality of frame elements of the droplet separation device.

This frame element 123 is integrated into the stack of frame elements forming the at least one condensation unit 121 and at least one adjacent evaporation unit 122, for example such that the at least one frame element 123 of the droplet elimination device 700 may be neighbored by and/or between one or two frame elements 122 of respective evaporation units.

As a further advantage, since one droplet elimination device 700 (i.e. at least one frame element 123 or a stack of frame elements 123) is attributed to one or two adjacent evaporation units 122, less steam pressure and/or steam flow and therefore lower flow velocities may occur in the drain passage 20. At the same time, this arrangement allows a shorter flow path in the drain passage 20 (i.e. only from one frame to the neighboring frame). Thus, a more reliable separating effect may be achieved, and therefore less risk of carrying droplets, solids in the second steam.

FIG. 6 shows a schematic representation of a further example of a distillation system comprising a plurality of serial stages (or sets comprising each a stage and a droplet elimination device) 201, 202, 203 according to embodiments of the present disclosure.

The system may also comprise more or less stages or sets, e.g. up to ten. The sets may be arranged on a similar height or on different heights.

The plurality of sets or stages of this particular system may also be referred to as a module (also cf. FIG. 8).

Accordingly, the example of FIG. 6 may correspond to any one of the preceding examples, wherein a plurality of stages or sets may be comprised by the system of FIG. 6. A stage may comprising at least one condensation unit 101, 111, 121 and at least one evaporation unit 102, 112, 122. A set may comprise a stage and in addition a droplet elimination device 700 attributed to said stage (either integrated or separated, as explained above).

Accordingly, a first set (or stage) 201 may be configured to generate steam and feed the steam to a second set 202. Therefore, the efficiency of the system in terms of energy consumption may be optimized, as the second steam can be reused to produce a third steam, and so on.

Each set or stage may be supplied in parallel with a respective feed liquid F1, F2, F3. The reason is that the feed liquid is supplied to each set/stage from above to be able to run down the respective condensation walls. A serial supply (where e.g. the concentrated feed liquid of the first set/stage is supplied to the second set/stage) may also be possible, in case means are provided to lift the concentrated feed liquid, e.g. a pump.

Figure 7:
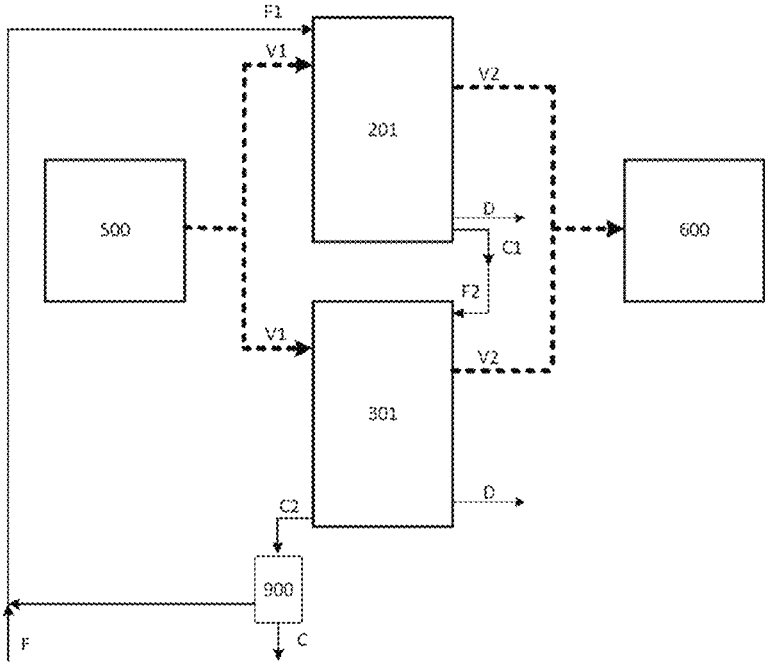
FIG. 7 shows a schematic representation of a further example of a distillation system comprising a plurality of parallel stages (or sets comprising each a stage and a droplet elimination device) according to embodiments of the present disclosure.

FIG. 7 shows a schematic representation of a further example of a distillation system comprising a plurality of parallel stages (or sets comprising each a stage and a droplet elimination device) 201, 301 according to embodiments of the present disclosure.

The system may also comprise more or less stages or sets, e.g. up to ten. Accordingly, the example of FIG. 7 may correspond to any one of the preceding examples, wherein a plurality of stages or sets may be comprised by the system of FIG. 7. Again, a stage may comprising at least one condensation unit 101, 111, 121 and at least one evaporation unit 102, 112, 122. A set may comprise a stage and in addition a droplet elimination device 700 attributed to said stage (either integrated or separated, as explained above).

The first steam V1 may be supplied in parallel to the first and third set 201, 301. Accordingly, sets 201 and 301 may be connected in parallel to the steam generator, i.e. a heating stage (for generating the first steam) 500 and/or the condenser, i.e. condensation stage 600 (for condensing the second steam V2).

Furthermore, the first set 201 and a third set 301 may be configured to be flowed through in series by the feed liquid F. The first set/stage 201 may be arranged above the third set/stage 301. Accordingly, gravity may automatically transport the concentrated feed liquid C1 coming from the first set to the third set. Note that the two sets do not need to be exactly one over the other, as long as the above-mentioned gravity effect can be achieved.

Therefore, the feed liquid F may be supplied to the most upper set 201 (as feed liquid F1), and then run down to the lowest set (in this example: set 301), wherein in each set the feed liquid can be concentrated. Then, the concentrated feed liquid C2 of the lowest set 301 may be provided to a concentrate collection container 900. In other words, the concentrate may be collected in a concentrate collection container 900. From this container crystals may be removed, e.g. together with the concentrate. Accordingly, the system of this example may operate in a crystallization process.

A part of the concentrate may be recirculated into the system, in order to further concentrate it. If necessary, fresh unconcentrated feed liquid F may be added to this concentrate, so that the process can be constantly be continued. It is noted that in the example of FIG. 7 the interconnections of the obtained distillate D and of the condensed feed liquid are not shown for simplicity reasons.

The process may be operated in low pressure. A pump is thus desirably connected to the condenser 600 (not show in FIG. 7).

FIG. 8 shows a schematic representation of a further example of a distillation system comprising a plurality of parallel multistage modules according to embodiments of the present disclosure.

The system may also comprise more or less modules or stages/sets.

Accordingly, the example of FIG. 8 may correspond to any one of the preceding examples, wherein the system may in particular be a combination of the examples of FIGS. 6 and 7.

A first (or stage) 201 set may be configured to generate steam and feed the steam to a second set 202 (optionally of the same module like the first set), the first and the second set may e.g. be arranged on a similar height. The first set 201 and a third set 301 may be configured to be flowed through in series by the feed liquid. The first set may e.g. be above the third set (i.e. in the system).

For example, a plurality of multistage distillation modules may be arranged on different heights in the system. Each module may comprise a plurality of sets, e.g. 201-204. The sets of a module may be arranged on a similar height, optionally by forming a horizontally arranged stack of frame elements. The modules may be arranged on different heights, optionally one above another.

Figure 9:
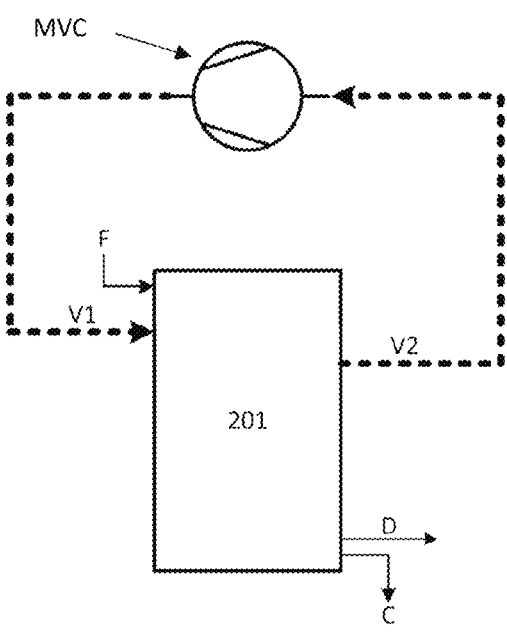
FIG. 9 shows a schematic representation of a further example of a distillation system comprising a MVC device according to embodiments of the present disclosure.

FIG. 9 shows a schematic representation of a further example of a distillation system comprising a mechanical vapor compression, MVC, device according to embodiments of the present disclosure.

Accordingly, the system may comprise or may be connected to a mechanical vapor compression, MVC, device, such that the second steam V2 is compressed by the MVC device and fed back as hotter first steam V1 to the first steam space.

Using a MVC device may be advantageous for crystallizers (i.e. when the system operates in a crystallization process), as these require a relatively high temperature difference. This can be achieved by the MVC in an energy efficient manner.

The MVC device may hence replace a heating stage (for generating the first steam) and a condensation stage (for condensation of the second steam).

When using a MVC device, the system may typically comprise one set or stage 201. However, also several stages may be employed (e.g. up six stages), if the compressor provides the suitable power. Moreover, it is also possible that the system comprises several parallel stages connected in parallel to the MVC device.

Optionally, a droplet elimination device (not shown in FIG. 9) may be arranged between the set 201 and the MVC (i.e. such potential droplets in the steam V2 can be separated), in order to protect the MVC from corrosive droplets. Furthermore, a droplet elimination device (not shown in FIG. 9) may be arranged between the MVC and the set 201 (i.e. such potential droplets in the steam V1 can be separated), in order to obtain distillate with a further purified characteristic (e.g. for pharmaceutical or medical use).

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A distillation system for concentrating a feed liquid, comprising:

at least one condensation unit and at least one adjacent evaporation unit, each unit being provided by a frame element assembled together to form a stack of frame elements, wherein the condensation unit comprises a first steam space and a condensation wall at least partly bordering the first steam space, and the evaporation unit comprises a second steam space, wherein a feeding area is provided between the condensation unit and the evaporation unit, the feeding area being bordered by the condensation wall, the system being configured such that:

the condensation wall is heated by a first steam in the first steam space the feed liquid flows on the condensation wall in the feeding area, a second steam arising from the feed liquid moves into the second steam space, wherein the feeding area is open towards the second steam space;

wherein the second steam space comprises a grid-formed spacer element that is thinner than the thickness of the frame element in a lateral view of the frame element.

2. The system according to claim 1, wherein the condensation wall is flexible, wherein at least one of:

the condensation wall comprises a foil, and the condensation wall is moveable within the feeding area.

3. The system according to claim 1, wherein the system is configured such that at least one of:

the condensation wall is deformed by the first steam into or towards the second steam space and the condensation wall moves back to an initial position thereof when the first steam is stopped to enter the first steam space or in case of a pressure balance between the first and the second steam space.

4. The system according to claim 1, wherein the system is configured such that the condensation wall is deformed by the first steam to get into contact with the grid-formed spacer element.

5. The system according to claim 1, wherein a drain passage is arranged below at least one of the second steam space and the feeding area, the drain passage being configured such that the feed liquid leaves the feeding area via the drain passage, together with the second steam.

6. The system according to claim 1, wherein the system further comprises at least one droplet elimination device consisting of at least one further frame element or a set of stacked frame elements.

7. The system according to claim 6, wherein at least one of:

the droplet elimination device comprises a third steam space connected to two vapor channels, such that the second steam flows from the second steam space via a vapor channel into the third steam space and leaves the third steam space via a further vapor channels, and the droplet elimination device forms a set of stacked frame elements which is at least one of separate and adjacent to the stack of frame elements forming the at least one condensation unit and at least one adjacent evaporation unit.

8. The system according to claim 6, wherein at least one of:

the droplet elimination device comprises a third steam space connected via the drain passage to the second steam space, such that the second steam flows from the second steam space via the drain passage into the third steam space, and the third steam space is connected to a vapor channel, such that the second steam leaves the third steam space via the vapor channel.

9. The system according to claim 8, wherein one of:

the droplet elimination device forms a set of stacked frame elements which is at least one of separate and adjacent to the stack of frame elements forming the at least one condensation unit and at least one adjacent evaporation unit, wherein the vapor channel is closed between both stacks, and the droplet elimination device forms at least one frame element which is integrated into the stack of frame elements forming the at least one condensation unit and at least one adjacent evaporation unit, such that the at least one frame element of the droplet elimination device is neighbored by two frame elements of respective evaporation units.

10. The system according to claim 1, wherein each frame element includes at least one of:

an outer frame and an inner frame, the inner frame encasing a central inner region and being surrounded by the outer frame, at least one passage opening, a drain passage and at least one vapor channel arranged between the outer frame and the inner frame, wherein the central inner region provides a steam space, and the inner frame comprises a surface which defines a plane, to which the condensation wall is attached for separating the first steam space from the second steam space.

11. The system according to claim 10, wherein the first steam space is connected to at least one of:

a vapor channel by at least one vapor channel opening constituting a through hole in the inner frame of the condensation unit, and a condensate collection passage arranged below the first steam space by at least one condensate channel opening constituting a through hole in the inner frame of the condensation unit, and the second steam space is connected to at least one of:

the vapor channel by at least one vapor channel opening constituting a through hole in the inner frame of the evaporation unit and/or a connecting notch provided on a front side of said inner frame, and the drain passage by at least one vapor channel opening constituting a through hole in the inner frame of the evaporation unit and/or a connecting notch provided on a front side of said inner frame.

12. The system according to claim 9, wherein at least one passage opening is arranged above the central inner region and separated from the central inner region by a frame wall of the inner frame, wherein at least one liquid passage is provided by the frame wall and configured to distribute a liquid from the first passage opening to the feeding area.

13. The system according to claim 1, wherein the system is a multistage distillation apparatus, comprising:

a plurality of serial sets, each set comprising a stage and a droplet elimination device, each stage comprising at least one condensation unit and at least one evaporation unit, wherein at least one of:

a first set is configured to generate steam and feed the steam to a second set, the first and the second set being arranged on a similar height, and the first set and a third set are configured to be flowed through in series by the feed liquid, the first set being above the third set.

14. The system according to claim 1, wherein the system comprises a mechanical vapor compression (MVC) device, such that the second steam is compressed by the MVC device and fed back as first steam to the first steam space.

15. The system according to claim 5, wherein the feed liquid leaves the feeding area via the drain passage together with the second steam.

16. The system according to claim 9, wherein the at least one frame element of the droplet elimination device is between the two frame elements of the respective evaporation units.

* * * * *